(12) United States Patent  (10) Patent No.: US 7,117,496 B1
Ramesh et al.  (45) Date of Patent: Oct. 3, 2006

(54) EVENT-BASED SYNCHRONIZATION

(75) Inventors: Bhashyam Ramesh, San Diego, CA (US); Debashis Mahata, West Bengal (IN); Srikant S. Sharma, Stony Brook, NY (US)

(73) Assignee: NCR Corporation, Dayton, OH (US)

( * ) Notice: Subject to any disclaimer, the term of this patent is extended or adjusted under 35 U.S.C. 154(b) by 822 days.

(21) Appl. No.: 09/851,592

(22) Filed: May 9, 2001

(51) Int. Cl.
*G06F 9/46* (2006.01)

(52) U.S. Cl. ...................... 718/102; 719/313

(58) Field of Classification Search ........ 718/100–108; 719/310–316, 318–320, 328
See application file for complete search history.

(56) References Cited

OTHER PUBLICATIONS

Pitts, Queues—Array Implementation—Functions, pp. 1-6.*
IBM, Event Control Block Wait and Post Semantics for Distributed Computing Environment / Posix Threads, Jun. 1996, vol. 39, pp. 223-228.*
Sun, Introduction to Library functions, Nov. 27, 2001.*
"Guide to DECthreads," Open VMS Alpha Version 7.2, Open VMS VAX Version 7.2, Compaq Computer Corporation, Jan. 1999, Chapters 1-3.

* cited by examiner

*Primary Examiner*—William Thomson
*Assistant Examiner*—Diem Cao
(74) *Attorney, Agent, or Firm*—Trop, Pruner & Hu, PC

(57) ABSTRACT

A synchronization method and apparatus defines event objects to enable synchronization of execution entities (e.g., threads). In one arrangement, the synchronization method and apparatus is used in conjunction with a Unix operating system. By defining event objects on which threads or other execution entities can wait upon, multiple threads can wait on one event, or alternatively, one thread can wait on multiple events. Furthermore, using the event-based synchronization method and apparatus, it is possible to specify behavior, particularly when one thread or other execution entity waits on multiple events. For example, the behavior specified can be that a condition is satisfied if any of the events occur, if all of the events occur, or some other logical combination of events occur.

25 Claims, 6 Drawing Sheets

EVENT-BASED SYNCHRONIZATION

BACKGROUND

Software in a computer system is made up of many layers. The highest layer is typically referred to as the application layer, followed by lower layers that include the operating system, device drivers (which usually are a part of the operating system), and other layers. In a system that is coupled to a network, various network and transport layers are typically also present.

Conventionally, in an operating system, a software program is run as one or more execution entities, such as threads, processes, and so forth. For example, in some Unix operating systems, a process is defined as the execution of a program. The operating system schedules multiple processes for execution, with concurrently scheduled processes appearing to execute simultaneously. A scheduler in the operating system schedules a period of time (sometimes referred to as a time slice or time quantum) for each process, using a priority scheme to determine which process to schedule next.

In other Unix operating systems, execution entities are threads associated with processes or programs. Each process has an execution context that is unique to the process, with each process associated with an address space, a set of resources accessible by the process, and a set of one or more threads that belong to the process. Each process has at least one thread that is created and that belongs to the process, although a process can have multiple threads that belong to it.

Because multiple threads (either associated with a single process or with multiple processes) can be active at a given time, a synchronization mechanism is desirable. However, conventional synchronization mechanisms based on low-level primitives such as mutexes and condition variables in Unix systems may not provide a desired level of flexibility.

SUMMARY

In general, methods and apparatus according to the invention comprise an event-based synchronization mechanism, which is based on one or more events (an event signifying the determination of an action). For example, in a system having a Unix operating system and a plurality of execution entities, an event control module is adapted to create an event having a state. One or more of the execution entities are adapted to wait on the event, and a controller is adapted to signal the one or more threads to awaken the one or more threads if the event state changes to a predetermined state.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
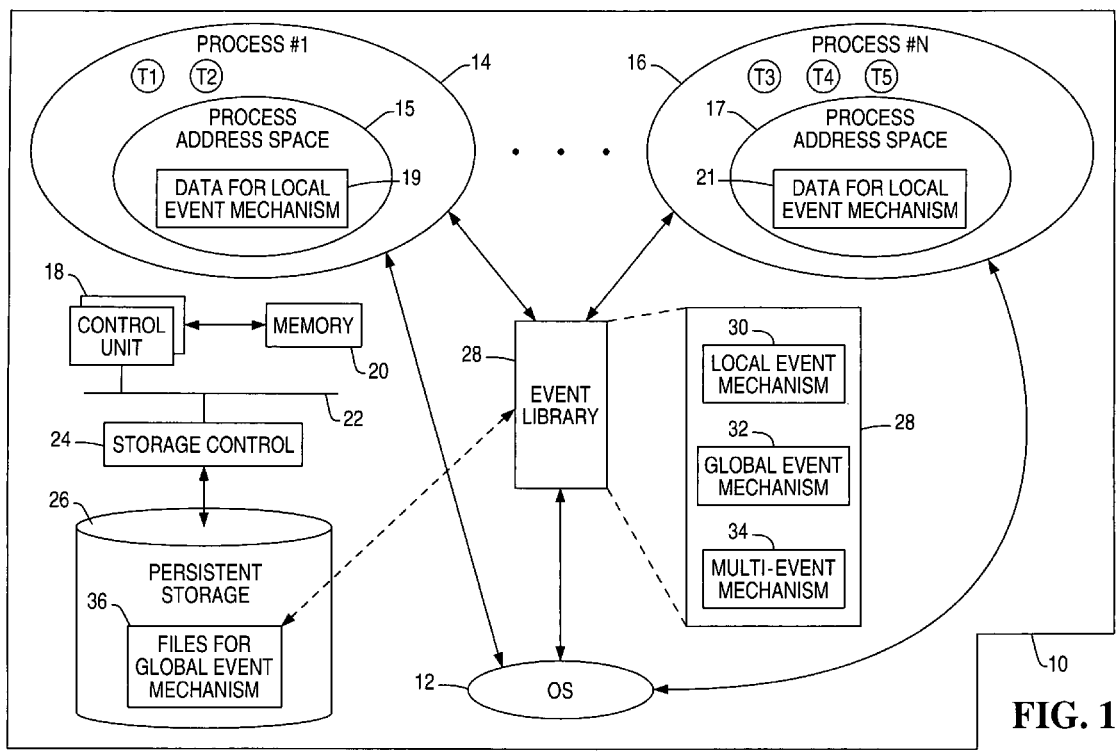
FIG. 1 is a block diagram of an example system incorporating an embodiment of the invention.

FIG. 1 shows an example system 10 that has an operating system 12 and a plurality of processes or programs 14, 16 (although only two are shown, additional processes are executable in the system 10). In addition, at other times, only one process is active. As shown in FIG. 1, the process 14 is associated with threads T1, T2, and the process 16 is associated with threads T3, T4, and T5.

According to some embodiments, the operating system is a Unix operating system, such as a Solaris operating system, Linux operating system, or HP-UX operating system. Other types of Unix operating systems are also contemplated. Also, instead of Unix operating systems, other types of operating systems can be employed in further embodiments.

The processes 14 and 16 (and threads associated with the processes) and the operating system 12 are executable on one or more control units 18, which are coupled to a memory 20. The control unit 18 is connected to various peripheral devices in the system 10, including a storage control device 24 that is coupled to a stable or persistent storage 26. Examples of stable or persistent storage 26 include magnetic media (e.g., a hard disk), optical media (e.g., a compact disk or digital video disk), and others.

Multiple threads are executed for each process to provide improved performance of the process. For example, a process that has to perform several tasks can use multiple threads to perform the several tasks. Thus, even if one thread is waiting for some event to occur, another thread can continue to perform another task. In addition, in a system having multiple controls units 18, different threads can be executed in parallel on different control units 18.

Each process is associated with an execution context (e.g., an address space 15 or 17 and other allocated resources). Threads associated or belonging to the process share the same execution context. Each thread has a thread identifier to allow it to be uniquely identified in the system 10.

In accordance with some embodiments of the invention, an event-based synchronization mechanism is provided to synchronize multiple threads (whether they are within the same process or across processes). The event-based synchronization mechanism defines events and other objects to allow synchronization of concurrently active threads (or other types of execution entities). For example, a first thread can wait on an event to be signaled by a second thread. Use of events for synchronization between threads enables the provision of behaviors that are generally not available with the use of low-level synchronization primitives such as mutexes or condition variables (defined by some Unix operating systems).

The event library 28 provides for a mechanism for creating events, naming events, waiting on events, and associating attributes to an event for controlling behavior of an event. Any process (e.g., process 14 or 16) can link to the event library 28 to use the mechanisms available in the event library 28. When the event library 28 (or routines associated with the event library 28) is invoked, the executing module or modules can collectively be referred to as an "event control module."

The event library 28 contains several segments, including a segment 30 providing for a local event mechanism, a segment 32 providing for a global event mechanism, and a segment 34 providing for a multiple-event mechanism. The event control module, when executed by the one or more control units 18, controls the generation of objects to enable synchronization between active threads in the system 10. The local event mechanism 30 controls the synchronization of threads within a process. The global event mechanism 32 controls the synchronization of threads of different processes. The multi-event mechanism 34 enables a thread to wait on multiple events, with the waiting thread awakened or otherwise notified if any of the events is set, all of the events are set, or some combination of events are set (depending on whether a logical OR, logical AND, or some other boolean function of the events is defined).

The underlying primitives used by the event library 28 (or event control module when the event library 28 is executed) to provide event-based synchronization are condition variables and mutex (mutual exclusion) objects. Condition variables and mutex objects are primitives defined by some Unix operating systems. A mutex object (also referred to as a mutex) is used by multiple threads to ensure the integrity of a shared resource (e.g., shared data) that is accessible by the multiple threads. A mutex has two states: locked and unlocked. For each given piece of shared data, all threads accessing the data use the same mutex. A thread locks the mutex before it accesses the shared data and unlocks the mutex when it is finished accessing the data. If a mutex is locked by another thread, the thread requesting the lock either waits for the mutex to be unlocked or returns.

A condition variable allows a thread to block its own execution until some shared data reaches a particular state. A condition variable is a synchronization object used in conjunction with a mutex. While a mutex controls access to shared data, a condition variable allows threads to wait for that data to enter a defined state.

According to one embodiment, the event library 28 defines three types of objects: an event object, a barrier link object, and a barrier object. A barrier object is defined by a combination of a condition variable and a mutex. The barrier link object defines a link to the barrier object. The main purpose of the barrier link object is to provide an "indirection" to the barrier object. As discussed further below, use of the barrier link object provides the ability for a thread to wait on multiple events at the same time. The event object contains a state variable, a type variable, and a barrier link queue. The state variable indicates the state of the event (whether it is signaled or not signaled). If signaled, it indicates that the event associated with the event object has occurred. The type variable has a first state corresponding to a manual reset type and a second state corresponding to an auto-reset type. If the type variable indicates an auto-reset type, then the state variable is automatically cleared (to the not signaled state) if an event that is waited on occurs. However, if the type variable indicates the manual type, then a manual intervention is performed (through the event library 28 interface) to clear the state variable. The barrier link queue is a queue of barrier link objects.

Event objects defined by the local event mechanism 30 are referred to as local event objects. Local event objects are allocated in the process heap storage, which is a common resource of the process that is accessible by threads of the process. Data (19 or 21) associated with the local event mechanism 30 is stored in the address space 15 or 17 of the process 14 or 16 that the local event mechanism is associated with. Event objects defined by the global event mechanism 32 are referred to as global event objects, which are stored in files and memory mapped in the address space of the requesting process. A mechanism of named events is provided by using the name of the file with which the global event is associated. By using named events, synchronization of threads across multiple processes is simplified. Files (36) associated with the global event mechanism 32 are stored in the storage 26. Depending on whether they are defined by the local event mechanism 30 or global event mechanism 32, the barrier object and barrier link object are also allocated in a manner similar to that of the event object. Global barrier objects and global barrier link objects are stored in a file called the barrier file. The event files and barrier file are created and managed by the event library 28.

Figure 2:
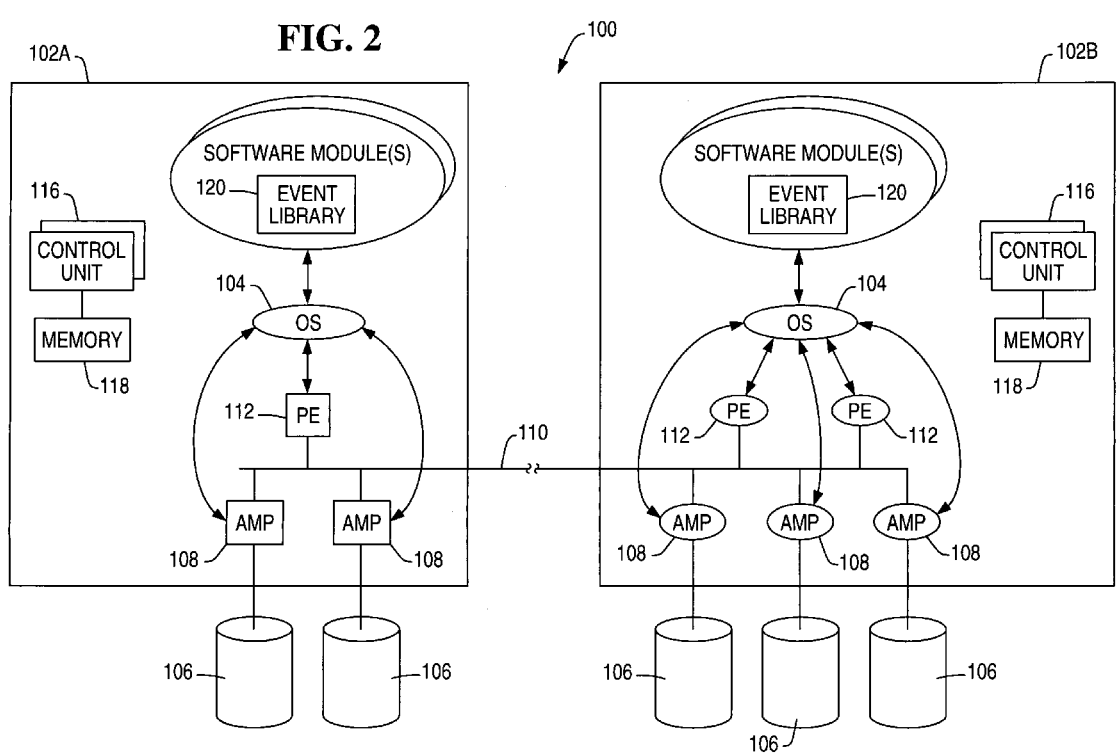
FIG. 2 is a block diagram of a database system incorporating an embodiment of the invention.

FIG. 2 illustrates another example system that is capable of using the event-based synchronization mechanism according to some embodiments of the invention. FIG. 2 illustrates a database system 100 that includes one or more nodes 102A, 102B. Each node 102A includes an operating system 104 (e.g., a Unix operating system). Each node 102 is associated with one or more storage modules 106. The storage modules 106 are not necessarily separate physical devices, but instead can be logical partitions or portions of a single physical device or system. Each storage module 106 is managed by a respective access module processor (AMP) 108. One or more parsing engines (PEs) 112 are also executable in each node 102. The AMPs 108 and PEs 112 are interconnected by an interconnect network 110.

Some or all of the software routines or modules in each node 102 can be operating system-specific. Such software routines or modules run as processes in each node 102, with each process containing one or more threads to perform various tasks. The various processes and threads are executable on one or more control units 116 in each node, with the one or more control units 116 coupled to a memory 118.

As in the system 10 of FIG. 1, an event library 120 is initially stored in a storage module 106 accessible by each node 102. For example, the event library 120 is stored in a first storage module 106 accessible by the node 102A, while the event library 120 is also stored in another storage module 106 accessible by the node 102B. The event library 120 can be loaded from the storage module 106 into each respective node 102 for execution, with the various processes able to link to the event library 120 to invoke the event mechanisms available in the event library 120. When executed in a node, the event library is referred to as an event control module.

Figure 3:
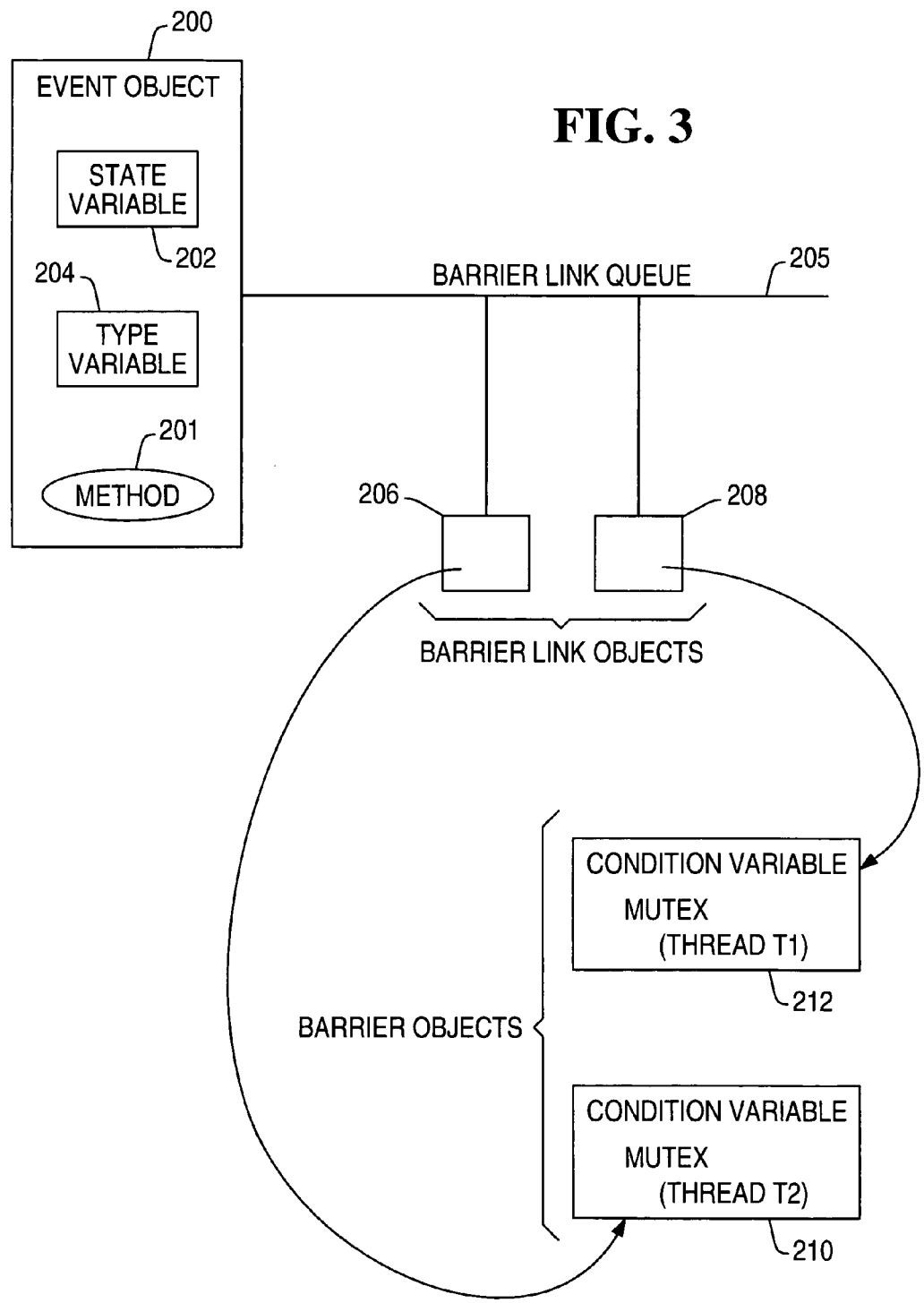
FIG. 3 is a block diagram of an event-based synchronization mechanism according to one embodiment.

FIG. 3 illustrates a representation of an event object 200, barrier link objects 206 and 208, and barrier objects 210 and 212. An event object 200 includes a state variable 202, a type variable 204, and a barrier link queue 205. In the example, the state variable 202 at this point is assumed to be in the "not signaled" state. The barrier link queue 205 includes two barrier link objects 206 and 208, which contain links or pointers to respective barrier objects 210 and 212. The event object 200 is also associated with a method 201 that can be invoked (such as by a thread) to perform synchronization-related tasks. The barrier object 210 is associated with thread T2, and contains a condition variable and mutex. The barrier object 212 is associated with thread T1, and contains its condition variable and mutex. Thus, each of the threads T1 and T2 waiting on an event associated with event object 200 waits on their own barrier object 210 or 212. The thread also adds a barrier link object 206 or 208 to the queue 205 that points to the barrier object.

Figure 4:
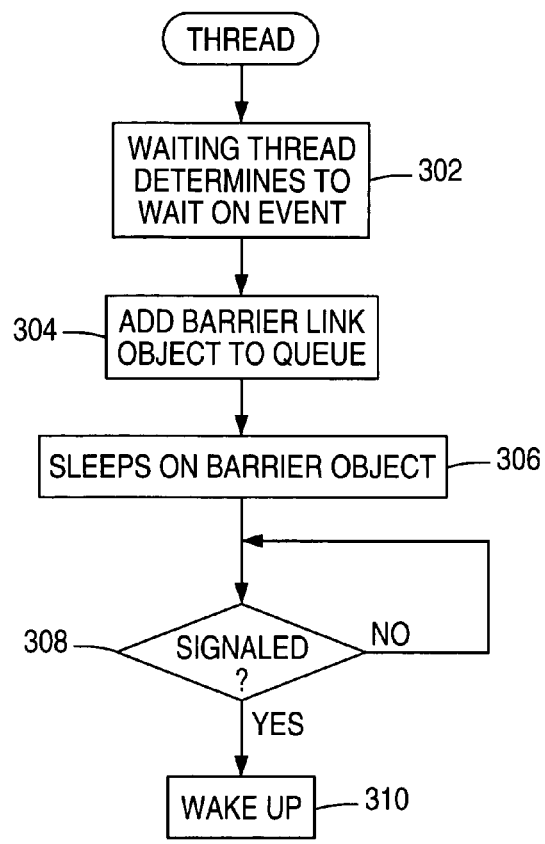
FIG. 4 is a flow diagram of acts performed by a thread executing in the system of FIG. 1 or 2.
Figure 5:
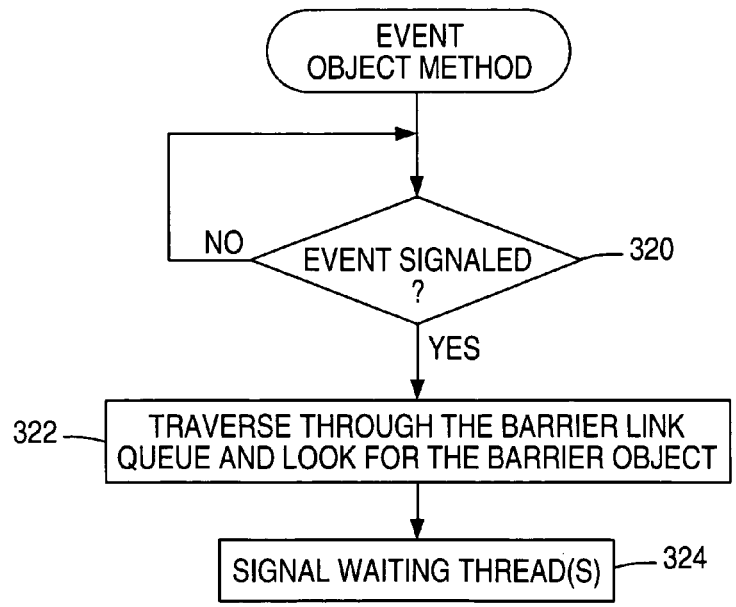
FIG. 5 is a flow diagram of acts performed by a method associated with an event object in the event-based synchronization mechanism of FIG. 3.

FIGS. 4 and 5 illustrate acts performed by the local and global mechanisms for handling local and global events. The acts are the same for both local and global events—the difference is in allocation of the local and global event objects. As shown in FIG. 4, each thread determines (at 302) if it needs to wait on an event. If so, the thread adds (at 304) a barrier link object (which points to the barrier object) to the barrier link queue of the event object associated with the event that the thread is waiting on. The thread then sleeps (at 306) on the barrier object by waiting on its condition variable.

As further shown in FIG. 5, the method 201 associated with the event object determines if the event has been signaled (at 320). If so, the event object method traverses the barrier link queue (at 322) and signals one or more of the waiting threads (at 324) depending on the type specified by each thread. Signaling of a thread is accomplished by signaling the condition variable of the barrier object associated with the thread. The signaled or non-signaled state is automatically cleared for events of the auto-reset type; while the state is explicitly cleared (using an event library interface) for events that are of the manual reset type. Thus, if the event object is of the auto-reset type, then signaling of the event causes the event object state to set and reset (or clear) automatically. As a result, if there are multiple threads waiting on the event object, then only one thread is awakened. On the other hand, with an event object of the manual reset type, once an event object is signaled, the state of the event object remains set unless manually or explicitly cleared by some other thread. As a result, once the event object state is set, all threads waiting on the event are awakened (by signaling respective condition variables associated with the waiting threads).

Designation of an event object type as being the auto-reset type or manual reset type can be used for the purpose of synchronization or notification. Since a manual reset type event requires explicit clearing, signaling of the event serves to "notify" all waiting threads of the occurrence of the event. On the other hand, since an auto-reset event is automatically cleared after it is signaled, the toggling (set-reset) of the event state can be used to synchronize activities of two threads (such as when two threads are attempting to access a shared resource).

As shown in FIG. 4, when the thread that is waiting on the event is signaled (at 308), it is awakened (at 310).

Figure 6:
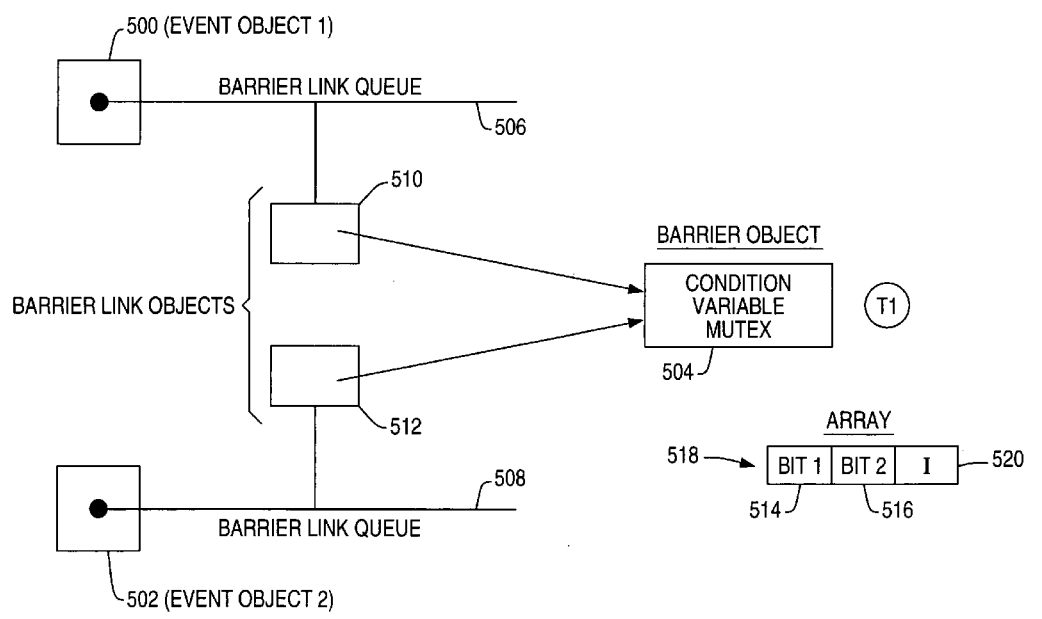
FIG. 6 is a block diagram of an event-based synchronization mechanism according to another embodiment with which a thread is able to wait on multiple events.

FIG. 6 shows an example where a single thread (e.g., T1) waits on multiple events. A barrier object 504 is associated with thread T1. Also, in the illustrated example, there are two event objects 500 and 502 corresponding to two different events that thread T1 is waiting on. Since the barrier object 504 is waiting on multiple events, an array 518 containing bits or flags 514 and 516 (corresponding to event objects 500 and 502, respectively) is associated with the barrier object 504. Also, the array 518 contains an indicator 520 to specify the logical behavior (e.g., logical AND, logical OR, etc.). The array 518 can be part of the barrier object 504. Whether the condition variable of the barrier object 504 is signaled in response to one or both events being signaled depends on the behavior specified for the multi-event wait. The behavior can be a logical OR behavior, in which case the condition variable is set if either bit 514 or 516 is set (which corresponds to event object 500 or 502 being signaled). However, a logical AND behavior can also be specified. In this case, the condition variable of the barrier object is not signaled until both bits 514 and 516 have been set. Other boolean behaviors can also be specified.

Figure 7:
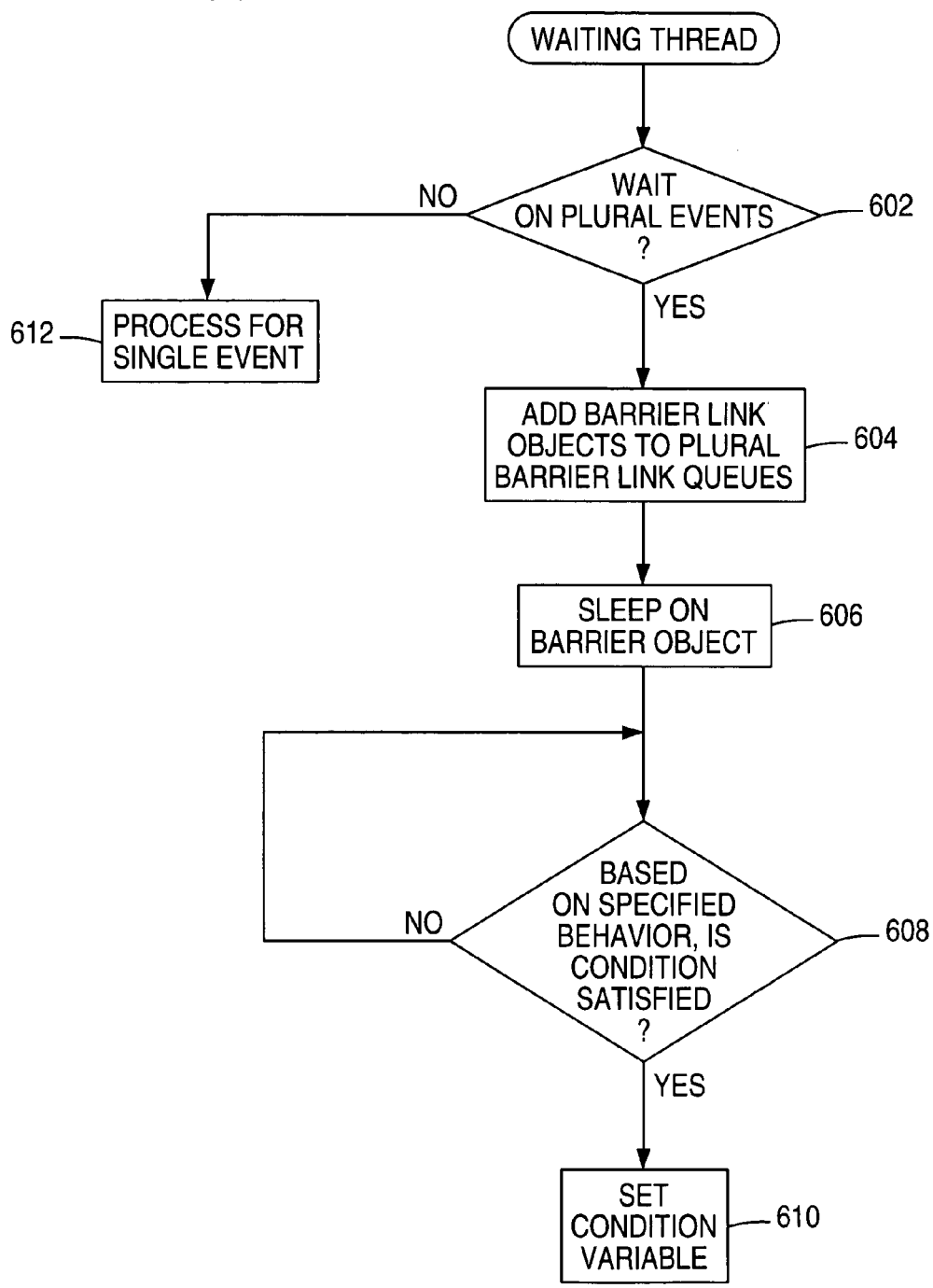
FIG. 7 is a flow diagram of acts performed by a thread waiting on multiple events.

As further shown in FIG. 7, the thread determines (at 602) if it is to wait on plural events (e.g., those events associated with event objects 500 and 502). If not, then processing proceeds for a single event (at 612), as described in connection with FIGS. 4 and 5. However, if thread T1 is to wait on plural events, the thread T1 adds (at 604) barrier link objects 510 and 512 to the barrier link queue 506 of the event object 500 and the barrier link queue 508 of the event object 502. Both the barrier link objects added to queues 506 and 508 point to the same barrier object 504. The thread T1 then sleeps (at 606) on the barrier object 504.

The method or routine associated with each event object determines (at 608) if the condition waited for has been satisfied. Whether the condition is satisfied depends on the logical behavior specified and the occurrence of one or both of the events associated with event objects 500 and 502. The logical behavior of the wait (e.g., logical AND of events or logical OR of the events waited on) is specified by the indicator 520 in the array 518. Thus, the event object method or routine signals the CV of the barrier object 504 depending on the state of bits 514 and 516 in the array 518 and the state of the logical behavior indicator 520. If the condition has been satisfied, the associated method or routine signals (at 610) the condition variable to awaken the associated thread T1.

Event-based synchronization mechanisms provide a richer set of features than generally available by use of low-level Unix primitives (e.g., mutexes and condition variables) only. For example, by creating events, multiple threads can wait on a single event. Also, a single thread can wait on multiple events, with various types of behaviors specified (e.g., logical OR, logical AND, etc.).

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. A "controller" can also refer to plural hardware components, software components, or some combination thereof.

The storage modules referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs). Instructions that make up the various software routines or modules in the various devices or systems are stored in respective storage units. The instructions when executed by a respective control unit cause the corresponding device or system to perform programmed acts.

The instructions of the software routines, or modules are loaded or transported to each device or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A system comprising:
    a Unix operating system;
    a plurality of execution entities, the plurality of execution entities including a first execution entity;
    an event control module adapted to create event objects representing respective events each having a state, the first execution entity to wait on plural events;
    a data structure associated with the first execution entity, the data structure containing information of the plural events that the first execution entity is waiting on, the data structure further containing an indicator settable to one of plural values to specify respective plural logical relationships between the plural events; and
    a controller adapted to awaken the first execution entity by signaling the first execution entity in response to one or more event state changes of the states of the plural events according to the logical relationship specified by the indicator,
    wherein each event object contains an indication of the state of the event, wherein the indication has a first state to indicate that the corresponding event has been signaled and a second state to indicate that the corresponding event has not been signaled,
    wherein each event object has a type indication to indicate whether the event object state indication is to be automatically reset to the second state from the first state once the event has been signaled or to be manually reset to the second state from the first state by an explicit action,
    wherein if a particular one of the event objects is to be automatically reset, then only one of plural execution entities waiting on the particular event object will be awakened in response to the corresponding event being signaled, and
    wherein if the particular event object is to be manually reset, then all execution entities waiting on the particular event object will be awakened in response to the corresponding event being signaled.

2. The system of claim 1, wherein the event control module is adapted to define a queue for a first one of the event objects, the queue having plural entries corresponding to plural execution entities waiting on the event represented by the first event object.

3. The system of claim 2, wherein the event control module is adapted to further create second objects, wherein each entry of the queue comprises a link to a corresponding second object, each execution entity to sleep on an associated second object to wait on the event represented by the first event object.

4. The system of claim 3, wherein each second object is defined by a condition variable.

5. The system of claim 4, wherein the controller signals each thread by signaling the condition variable.

6. The system of claim 3, wherein each second object is defined by a condition variable and a mutex.

7. The system of claim 1, further comprising queues associated with corresponding event objects representing events the first execution entity is waiting on, each queue containing an entry corresponding to the first execution entity.

8. The system of claim 7, wherein the event control module is adapted to define a barrier object, the first execution entity to sleep on the barrier object to wait on the plural events, the queue of each event object containing a link to the barrier object.

9. The system of claim 8, wherein the barrier object is defined at least by a condition variable.

10. The system of claim 8, wherein the barrier object is defined at least by a condition variable and a mutex.

11. The system of claim 1, wherein the event control module comprises a library.

12. The system of claim 1, wherein the execution entities comprise threads.

13. The system of claim 12, further comprising plural processes, each process associated with one or more threads, the event control module to create a local event to synchronize threads within a process and to create a global event to synchronize threads of different processes.

14. The system of claim 13, wherein the global event comprises a named event.

15. The system of claim 1, further comprising a plurality of nodes, each node comprising one or more of the plurality of execution entities.

16. The system of claim 1, wherein the indicator is settable to a first value to specify a logical AND relationship between the plural events, and in response to the first value of the indicator, the controller to awaken the first execution entity in response to all of the plural events waited on by the first execution entity being signaled.

17. The system of claim 16, wherein the indicator is settable to a second value to specify a logical OR relationship between the plural events, and in response to the second value of the indicator, the controller to awaken the first execution entity in response to any of the plural events waited on by the first execution entity being signaled.

18. An article comprising at least one storage medium containing instructions for providing event-based synchronization in a system in which execution entities are running, the instructions when executed causing the system to:
    generate event objects in a Unix operating system environment representing events used for synchronizing execution entities in the system, each event object having a state to indicate if the corresponding event has been signaled;
    provide a queue containing entries associated with a first event object, each entry associated with a corresponding execution entity, the plural entries of the queue enabling plural execution entities to wait on the first event object; and
    selectively set a type variable to one of a first value and a second value, the first value indicating that the first event object is of an auto-reset type, and the second value indicating that the first event object is of a manual reset type;
    in response to the state of the first event object indicating the corresponding event has been signaled, automatically clear the state of the first event object to an un-signaled state and awaken only one of the plural execution entities waiting on the first event object in response to the type variable being set to the first value, and not clear the state of the first event object until manually cleared and awaken all threads waiting on the first event object in response to the type variable being set to the second value.

19. The article of claim 18, wherein the instructions when executed cause the system to further create barrier objects, each execution entity waiting on a corresponding barrier object to wait on an event.

20. The article of claim 19, wherein the instructions when executed cause the system to create barrier objects by defining each barrier object based on a condition variable according to the Unix operating system.

21. The article of claim 19, wherein the instructions when executed cause the system to create barrier objects by defining each barrier object based on a condition variable and mutex according to the Unix operating system.

22. The article of claim 19, wherein the queue of the first event object contains entries pointing to the barrier objects of the plural execution entities waiting on the first event object.

23. The article of claim 22, wherein the instructions when executed cause the system to provide a routine associated with each event object, the routine of the first event object to traverse the queue of the first event object and to signal the barrier objects pointed to by the entries in the queue of the first event object.

24. The article of claim 18, wherein a first one of the execution entities waits on plural events represented by respective event objects, the instructions when executed causing the system to:

provide a data structure containing information of the plural events waited upon by the first execution entity, the data structure further containing an indicator settable to one of plural values to specify respective plural logical relationships between the plural events waited on by the first execution entity; and awaken the first execution entity in response to states of the plural events waited upon by the first execution entity according to the logical relationship specified by the indicator.

25. The article of claim 24, wherein the instructions when executed cause the system to set the indicator to a value to indicate a logical AND relationship, wherein awakening the first execution entity is in response to all of the plural events waited upon by the first execution entity being signaled.

* * * * *